United States Patent Office 3,475,424
Patented Oct. 28, 1969

3,475,424
2 - (α - HYDROXYALKYLIDENE)THIAZOLO[2,3 - c][1,2,4]BENZOTHIADIAZIN - 1(2H) - ONE, 5,5 - DIOXIDE ESTERS, RELATED COMPOUNDS AND THE PROCESS FOR THEIR PREPARATION
Peter H. L. Wei, Upper Darby, and Stanley C. Bell, Penn Valley, Pa., assignors to American Home Products Corporation, New York, N.Y., a corporation of Delaware
No Drawing. Continuation-in-part of application Ser. No. 681,903, Nov. 9, 1967. This application Feb. 12, 1968, Ser. No. 704,582
Int. Cl. C07d 93/22
U.S. Cl. 260—243       10 Claims

ABSTRACT OF THE DISCLOSURE

This invention is concerned with the esters and the free alcohols of 2-(α-hydroxyalkylidene)thiazolo[2,3-c][1,2,4]benzothiadiazin - 1(2H) - one, 5,5 - dioxides; and 2 - (α - hydroxyalkylidene)thiazolo[3,2 - a]benzimidazol - 1 - (2H) - ones which are pharmacologically active as central nervous system depressants. Further, this invention is concerned with the process for the preparation of these compounds.

---

This is a continuation-in-part of application of U.S. patent application, Ser. No. 681,903, filed on Nov. 9, 1967 by Peter H. L. Wei and Stanley C. Bell having the same title as the subject application and now abandoned.

This invention relates to new and novel nitrogen and sulfur containing tricyclic compounds and the process for their preparation. In particular, this invention concerns the esters and free alcohols of 2-(α-hydroxyalkylidene)thiazolo[2,3 - c][1,2,4]benzothiadiazin - 1(2H)-one, 5,5-dioxides; and 2-(α-hydroxyalkylidene)thiazolo[3,2 - a]benzimidazol - 1 - (2H) - one which have central nervous system depressant properties when tested under standard and acceptable pharmacological procedures.

The new and novel compounds within the scope of the present invention are exemplified by the following formula:

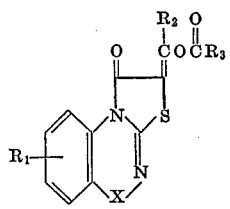

wherein $R_1$ is selected from the group consisting of hydrogen, halogen, lower alkyl and lower alkoxy; $R_2$ is lower alkyl; $R_3$ is selected from the group consisting of hydrogen and lower alkyl; and X is selected from the group consisting of a direct bond and sulfonyl. As employed herein the terms "lower alkyl" and "lower alkoxy" are meant to include those branched and straight chain moieties containing from about one to about eight carbon atoms.

The new and novel compounds of this invention which are represented by the above formula where X is sulfonyl are described as "2 - (α-hydroxyalkylidene)thiazolo[2,3 - c][1,2,4]benzothiadiazin - 1(2H) - one, 5,5-dioxides," for example, 8 - chloro-2-(α-hydroxyethylidene)thiazolo[2,3 - c][1,2,4]benzothiadiazin - 1(2H)-one, 5,5-dioxide, acetate and 2-(α-hydroxyethylident)thiazolo[2,3 - c][1,2,4]benzothiadiazin - 1(2H) - one, 5,5-dioxide. Alternatively, when X is a direct bond these compounds are named as "2-(α-hydroxyalkylidene)thiazolo[3,2 - a]benzimidazol - 1 - (2H) - ones," such as, 2 - (α - hydroxyethylidene)thiazolo[3,2 - a]benzimidazol-1-(2H)-one, acetate and 7-chloro-2-(α-hydroxyethylidene)thiazolo[3,2-a]benzimidazol-1-(2H)-one.

The compounds of the present invention are prepared by the process which is schematically illustrated as follows:

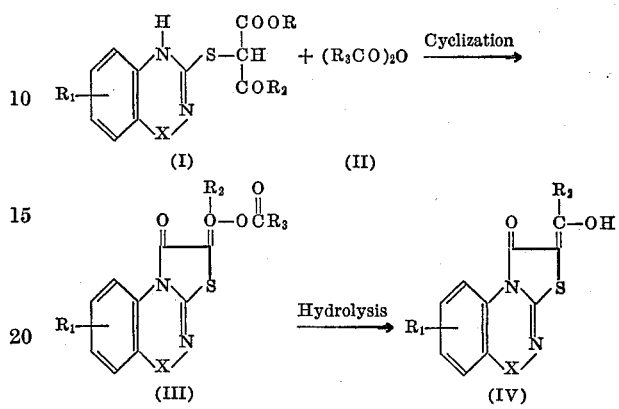

wherein $R_1$, $R_2$, $R_3$ and X are defined as above and R is lower alkyl.

The new and novel cyclization reaction of this invention is effected by contacting an appropriate acylacetic acid ester (I) with a carboxylic acid anhydride (II) at a temperature range from about 100° C. to about reflux temperatures for a period of about one to about five hours. When the cyclization reaction is complete, the resulting ester (III), either a 2-(α-hydroxyalkylidene)thiazolo[2,3 - c][1,2,4]benzothiadiazin - 1(2H) - one, 5,5-dioxide or a 2-(α-hydroxyalkylidene)thiazolo[3,2-a]benzimidazol-1-(2H)-one, is separated by conventional procedures. For example, the reaction mixture is treated with charcoal, concentrated, the residue treated with ether and then recrystallized from a suitable solvent, e.g. benzene, toluene and xylene.

The hydrolysis reaction is conducted by admixing the above prepared ester (III) with an alkanol at about reflux temperatures for a period of about two hours. When the hydrolysis reaction is complete, the resulting alcohol (IV) is separated by standard recovery procedures, e.g. the reaction mixture is cooled, filtered and the collected solid recrystallized from an appropriate solvent, e.g. acetonitrile.

The 2 - (1,1 - dioxo-2H-1,2,4-benzothiadiazin-3-ylthio) acylacetic acid esters employed as starting compounds to prepare the 2 - (α - hydroxyalkylidene)thiazolo[2,3-c][1,2,4] benzothiadiazin - 1(2H) - one, 5,5 - dioxide esters of the present invention are prepared and described in copending and cofiled U.S. patent application, Ser. No. 681,884, entitled "2 - (1,1 - Dioxo - 2H - 1,2,4 - Benzothiadiazin - 3 - ylthio)Acylacetic Acid Esters and Related Compounds." The 2 - (2 - benzimidazolylthio) acylacetic acid esters employed as starting compounds to prepare the 2 - (α - hydroxyalkylidene)thiazolo[3,2-a]benzimidazol - 1 - (2H) - one esters of the present invention may be prepared by the procedure described by D'Amico et al. in J.O.C., 29, 865 (1964). The carboxylic acid anhydrides are commercially available and may also be prepared by procedures well known to those skilled in the art of chemistry.

The new and novel compounds of the present invention possess valuable pharmacological activity. In particular, these compounds in standard pharmacological procedures demonstrate nervous system activity and are useful as depressants. Because of this property they are of importance in experimental and comparative pharmacology.

In the pharmacological evaluation of the central nervous system depressant compounds of this invention the in vivo effects of the compounds of this invention are tested as follows:

The compound is administered orally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile simulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate Method" [Nathan B. Eddy and Dorothy Leimbach, J. Pharmacol Exper. Therap., 107, 385 (1953)] is used to test for analgesia. The experiment is terminated by subjecting each animal to a maximal electroshock to test for anti-convulsant activity.

The compounds of this invention in the above test procedure induce increased motor activity and produce sedative-ataxic effect at 400 mg./kg. There were no deaths in the test animals at the highest dose used, 400 mg./kg.

When the compounds of this invention are employed as central nervous system depressants they may be administered alone or in combination to warm-blooded animals, e.g. mice, rats, rabbits, guinea pigs, dogs, cats, monkeys and the like, with pharmacologically acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present pharmacologically active agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration:

EXAMPLE I

2 - (6 - chloro - 1,1 - dioxo - 2H - 1,2,4 - benzothiadiazin - 3 - ylthio) acetoacetic acid, ethyl ester (5.0 g.) is heated to reflux in 50 ml. of acetic anhydride for three hours. Thereafter, the reaction mixture is treated with Darco, the residue treated with ether and the recrystallized from benzene to afford 8-chloro-2 - (α - hydroxyethylene) thiazolo[2,3-c][1,2,4]benzothiadiazin - 1(2H) - one, 5,5 - dioxide acetate, M.P. 198–200° C.

Analysis.—Calcd. for $C_{13}H_9ClN_2O_5S_2$: C, 41.89; H, 2.43; Cl, 9.51; N, 7.52; S, 17.21. Found: C, 41.92; H, 2.42; Cl, 9.2; N, 7.48; S, 17.2.

In a similar manner, 2-(7-bromo-1,1-dioxo-2H-1,2,4-benzothiadiazin-3-ylthio)acetoacetic acid, methyl ester is converted to 7 - bromo-2-(α-hydroxyethyliden)thiazolo[2,3-c][1,2,4]benzothiadiazin - 1(2H) - one, 5,5-dioxide, acetate

EXAMPLE II 2-(7-methyl - 1,1 - dioxo - 2H - 1,2,4 - benzothiadiazin-3-ylthio) acetoacetic acid, ethyl ester (15.0 g.) is heated to 100° C. in 150 ml. of acetic anhydride for two hours. Thereafter, the reaction mixture is treated with charcoal, concentrated, the residue treated with ether and then recrystallized from toluene to afford 2 - (α - hydroxyethylidene) - 7 - methylthiazolo[2,3-c][1,2,4]benzothiadiazin-1(2H)-one, 5,5-dioxide, acetate.

In the same way, 2-(7 - ethyl - 1,1 - dioxo - 2H - 1,2,4-benzothiadiazin - 3 - ylthio)acetoacetic acid, butyl ester is converted to 7 - ethyl - 2 - (α - hydroxyethylidene) thiazolo[2,3-c][1,2,4]benzothiadiazin - 1(2H) - one, 5,5-dioxide, acetate.

EXAMPLE III 2-(6-methoxy - 1,1 - dioxo-2H-1,2,4-benzothiadiazin-3-ylthio)acetoacetic acid, ethyl ester (25.0 g.) is heated to reflux in 250 ml. of acetic anhydride for five hours. Thereafter, the reaction mixture is treated with charcoal, concentrated under vacuum, the residue treated with ether and then recrystallized from benzene to afford 2-(α-hydroxyethylidene) - 8 - methoxythiazolo[2,3-c][1,2,4]benzothiadiazin-1(2H)-one, 5,5-dioxide, acetate.

In the same manner, 2-(1,1-dioxo-2H-1,2,4-benzothiadiazin-3-ylthio)acetoacetic acid, ethyl ester is converted to 2 - (α-hydroxyethylidene)thiazolo[2,3-c][1,2,4]benzothiadiazin-1(2H)-one, 5,5-dioxide, acetate.

EXAMPLE IV

Repeating the cyclization procedure of Examples I to III, by contacting an appropriate 2-(1,1-dioxo-2H-1,2,4-benzothiadiazin-3-ylthio)acylacetic acid ester with a carboxylic acid anhydride, the following compounds are prepared:

8-fluoro-2-(α-hydroxypropylidene)thiazolo[2,3-c][1,2,4] benzothiadiazin-1(2H)-one, 5,5-dioxide, propionate;

2-(α-hydroxybutylidene)-8-propylthiazolo[2,3-c][1,2,4] benzothiadiazin-1(2H)-one, 5,5-dioxide, acetate;

8-ethoxy-2-(α-hydroxypropylidene)thiazolo[2,3-c [1,2,4]benzothiadiazin-1(2H)-one, 5,5-dioxide, butyrate; and 2-(α-hydroxybutylidene)-6-propoxythiazolo[2,3-c][1,2,4]benzothiadiazin-1(2H)-one, 5,5-dioxide, acetate.

EXAMPLE V 2-(2-benzimidazolylthio)acetoacetic acid, ethyl ester (10.0 g.) is heated to reflux in 100 ml. of acetic anhydride for three hours. Thereafter, the reaction mixture is treated with Darco, concentrated, the residue treated with ether and then crystallized from benzene to afford 2-(α-hydroxyethylidene)thiazolo[3,2-a]benzimidazol - 1 - (2H)-one, acetate, M.P. 192–194° C.

Analysis.—Calcd. for $C_{13}H_{10}N_2O_3S$: C, 56.92; H, 3.67; N, 10.22. Found: C, 56.62; H, 3.83; N, 10.86.

EXAMPLE VI 2-(2-benzimidazolylthio) - 5 - chloroacetoacetic acid, methyl ester (5.0 g.) is heated to reflux in 50 ml. of propionic anhydride for three hours. Thereafter, the reaction mixture is treated with charcoal, concentrated, the residue treated with ether and then recrystallized from xylene to afford 7-chloro-2-(α-hydroxyethylidene)thiazolo[3,2-a]benzimidazol-1-(2H)-one, propionate.

EXAMPLE VII

Repeating the procedure of Examples V and VI to react an appropriate 2-(2-benzimidazolylthio) acylacetic acid ester with a carboxylic acid anhydride, the following compounds are prepared:

6-bromo-2-(α-hydroxyethylidene)thiazolo[3,2-a]benzimidazol-1-(2H)-one, propionate;

2-(α-hydroxyethylidene)-7-methylthiazolo[3,2-a]benzimidazol-1-(2H)-one, acetate;

6-ethyl-2-(α-hydroxyethylidene)thiazolo[3,2-a]benzimidazol-1-(2H)-one, butyrate;

6-fluoro-2-(α-hydroxypropylidene)thiazolo[3,2-a]benzimidazol-1-(2H)-one, acetate;
2-(α-hydroxybutylidene)-7-propylthiazolo[3,2-a]benzimidazol-1-(2H)-one, propionate;
6-ethoxy-2-(α-hydroxypropylidene)thiazolo[3,2-a]benzimidazol-1-(2H)-one, acetate; and
2-(α-hydroxybutylidene)-6-propoxythiazolo[3,2-a]benzimidazol-1-(2H)-one, acetate.

EXAMPLE VIII

A mixture of 4.0 g. of 8-chloro-2-[α-hydroxyethylidene]thiazolo[2,3 - c][1,2,4]benzothiadiazine - 1(2H) - one, 5,5-dioxide, acetate and 200 ml. of ethanol is refluxed for two hours and concentrated to 150 ml. On cooling there is obtained 3.2 g. of product (as the alcoholate), M.P. 235–245° C. After recrystallization from acetonitrile, 8-chloro-2-(α - hydroxyethylidene)thiazolo [2,3-c][1,2,4]benzothiadiazine - 1(2H) - one, 5,5-dioxide, M.P. 266–268° C.

Analysis.—Calcd. for $C_{11}H_7ClN_2O_4S_2$: C, 39.94; H, 2.13; N, 8.47; Cl, 10.72. Found: C, 40.22; H, 2.17; N, 8.74; Cl. 10.77.

In the same manner, all the other compounds disclosed in Examples I to VII are hydrolyzed to afford the following alcohols:

7-bromo-2-(α-hydroxyethylidene)thiazolo[2,3-c][1,2,4]benzothiadiazin-1(2H)-one, 5,5-dioxide;
2-(α-hydroxyethylidene)-7-methylthiazolo[2,3-c][1,2,4]benzothiadiazin-1(2H)-one, 5,5-dioxide;
7-ethyl-2-(α-hydroxyethylidene)thiazolo[2,3-c][1,2,4]benzothiadiazin-1(2H)-one, 5,5-dioxide;
2-(α-hydroxyethylidene)-6-methoxythiazolo[2,3-c][1,2,4]benzothiadiazin-1(2H)-one 5,5-dioxide;
2-(α-hydroxyethylidene)thiazolo[2,3-c][1,2,4]benzothiadiazin-1(2H)-one, 5,5-dioxide;
8-fluoro-2-(α-hydroxypropylidene)thiazolo[2,3-c][1,2,4]benzothiadiazin-1(2H)-one, 5,5-dioxide;
2-(α-hydroxybutylidene)-8-propylthiazolo[2,3-c][1,2,4]benzothiadiazin-1(2H)-one, 5,5-dioxide;
8-ethoxy-2(α-hydroxypropylidene)thiazolo[2,3-c][1,2,4]benzothiadiazin-1(2H)-one, 5,5-dioxide;
2-(α-hydroxybutylidene)-6-propoxythiazolo[2,3-c][1,2,4]benzothiadiazin-1(2H)-one, 5,5-dioxide;
2-(α-hydroxyethylidene)thiazolo[3,2-a]benzimidazol-1-(2H)-one;
7-chloro-2-(α-hydroxyethylidene)thiazolo[3,2-a]benzimidazol-1-(2H)-one;
6-bromo-2-(α-hydroxyethylidene)thiazolo[3,2-a]benzimidazol-1-(2H)-one;
2-(α-hydroxyethylidene)-7-methylthiazolo[3,2-a]benzimidazol-1-(2H)-one;
6-ethyl-2-(α-hydroxyethylidene)thiazolo[3,2-a]benzimidazol-1-(2H)-one;
2-(α-hydroxyethylidene)-7-methoxythiazolo[3,2-a]benzimidazol-1-(2H)-one;
6-fluoro-2-(α-hydroxypropylidene)thiazolo[3,2-a]benzimidazol-1-(2H)-one;
2-(α-hydroxybutylidene)-7-propylthiazolo[3,2-a]benzimidazol-1-(2H)-one;
3-ethoxy-2-(α-hydroxypropylidene)thiazolo[3,2-a]benzimidazol-1-(2H)-one; and
2-(α-hydroxybutylidene)-6-propoxythiazolo[3,2-a]benzimidazol-1-(2H)-one.

What is claimed is:
1. A compound selected from the group consisting of:

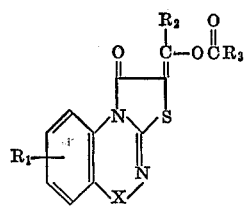

wherein $R_1$ is selected from the group consisting of hydrogen, chloro, bromo, fluoro, lower alkyl and lower alkoxy; $R_2$ is lower alkyl; $R_3$ is selected from the group consisting of hydrogen and lower alkyl; and X is selected from the group consisting of a direct bond and sulfonyl.

2. A compound as described in claim 1 which is: 8-chloro - 2 - (α-hydroxyethylidene)thiazolo[2,3-c][1,2,4]benzothiadiazin-1(2H)-one, 5,5-dioxide acetate.

3. A compound as described in claim 1 which is: 8-chloro - 2 - (α-hydroxyethylidene)thiazolo[2,3-c][1,2,4]benzothiadiazin-1(2H)-one, 5,5-dioxide.

4. A compound as described in claim 1 which is: 2-(α - hydroxyethylidene)thiazolo[3,2 - a]benzimidazol-1-(2H)-one, acetate.

5. A compound as described in claim 1 which is: 2-(α - hydroxyethylidene)thiazolo[3,2 - a]benzimidazol-1-(2H)-one.

6. A compound as described in claim 1 which is: 2-(α - hydroxyethylidene)thiazolo[2,3-c][1,2,4]benzothiadiazin-1(2H)-one, 5,5-dioxide acetate.

7. A compound as described in claim 1 which is: 2-(α - hydroxyethylidene)thiazolo[2,3-c][1,2,4]benzothiadiazin-1(2H)-one, 5,5-dioxide.

8. A compound as described in claim 1 which is: 7-chloro - 2 - (α - hydroxyethylidene)thiazolo[3,2 - a]benzimidazol-1-(2H)-one, propionate.

9. A compound as described in claim 1 which is: 7-chloro - 2 - (α - hydroxyethylidene)thiazolo[3,2 - a]benzimidazol-1-(2H)-one.

10. A process for the preparation of a compound having the formula:

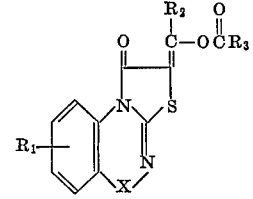

wherein $R_1$ is selected from the group consisting of hydrogen, chloro, bromo, fluoro, lower alkyl and lower alkoxy; $R_2$ and $R_3$ are lower alkyl; and X is selected from the group consisting of a direct bond and sulfonyl which comprises contacting a compound of the formula

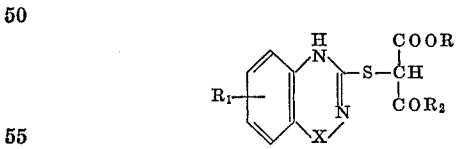

wherein $R_1$ and $R_2$ are defined as above and R is lower alkyl; with a carboxylic acid anhydride of the formula:

wherein $R_3$ is defined as above; at a temperature range from about 100° C. to about reflux temperatures for a period of about one to about five hours.

References Cited
UNITED STATES PATENTS
3,257,395  6/1966  Griot.

NICHOLAS S. RIZZO, Primary Examiner

U.S. Cl. X.R.
424—246